(12) United States Patent
Snell et al.

(10) Patent No.: US 12,321,407 B2
(45) Date of Patent: *Jun. 3, 2025

(54) CLUSTERED METASEARCH

(71) Applicant: Insight Direct USA, Inc., Chandler, AZ (US)

(72) Inventors: Cathy Snell, Durham, NC (US); Dhairya Kothari, Chicago, IL (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,072

(22) Filed: Apr. 3, 2024

(65) Prior Publication Data
US 2024/0273156 A1    Aug. 15, 2024

Related U.S. Application Data

(63) Continuation of application No. 18/106,715, filed on Feb. 7, 2023, now Pat. No. 11,971,939.

(60) Provisional application No. 63/413,788, filed on Oct. 6, 2022.

(51) Int. Cl.
*G06F 16/00* (2019.01)
*G06F 16/9538* (2019.01)
*G06F 16/954* (2019.01)
*G06F 40/216* (2020.01)

(52) U.S. Cl.
CPC ........ *G06F 16/9538* (2019.01); *G06F 16/954* (2019.01); *G06F 40/216* (2020.01)

(58) Field of Classification Search
CPC .................................................. G06F 16/954
See application file for complete search history.

(56) References Cited

U.S. PATENT DOCUMENTS

| | | |
|---|---|---|
| 7,519,605 B2 | 4/2009 | Vailaya et al. |
| 8,019,760 B2 | 9/2011 | Dos et al. |
| 8,370,362 B2 | 2/2013 | Szabo |
| 9,529,897 B2 | 12/2016 | Tang et al. |
| 10,223,465 B2 | 3/2019 | Goldenstein et al. |
| 10,521,421 B2 | 12/2019 | Cunico et al. |
| 11,176,124 B2 | 11/2021 | Balani et al. |
| 2012/0166180 A1 | 6/2012 | Au |
| 2021/0026906 A1 | 1/2021 | Reznik |
| 2021/0182350 A1 | 6/2021 | Gottumukkala et al. |
| 2021/0311974 A1 | 10/2021 | Dimassimo et al. |

*Primary Examiner* — Ajith Jacob
(74) *Attorney, Agent, or Firm* — Kinney & Lange, P.A.

(57) ABSTRACT

A clustered metasearch system receives a search query from a user. The system uses Natural Language Processing to identify an object of the search query and descriptors of the search query. The system sorts the search into an applicable realm based on the object of the search query. The system then conducts the search across a variety of search engines and collects root domains from the search results. Root domains within the same realm as the search query are prioritized and additional factors such as the presence of descriptors in the result, the recency of the result, the search engine rank of the result, and the distance from the center of the realm are used to determine the final ranking of the results. The results are then displayed to a user.

20 Claims, 5 Drawing Sheets

CLUSTERED METASEARCH

CROSS-REFERENCE TO RELATED APPLICATIONS

This application is a continuation of U.S. application Ser. No. 18/106,715, filed Feb. 7, 2023, and entitled "CLUSTERED METASEARCH," which claims priority to U.S. Application No. 63/413,788, filed Oct. 6, 2022, and entitled "CLUSTERED METASEARCH," the disclosures of which are hereby incorporated by reference in their entireties.

BACKGROUND

Web searches are typically run on commonly used search engines which take in user queries and return a list of results based on what the search engine determines to be most relevant to the user query. Various search engines can have different criteria for ranking search results higher or lower and thus can return different results or a different order of results to the user. Some results may not be responsive to the user query. Hence, a system for improving result relevance in response to user queries is desirable.

SUMMARY

A system for searching the internet includes a processor and computer-readable memory. The computer-readable memory is encoded with instructions that, when executed by the one or more processors, cause the system to perform the following steps. The system receives a search query at a search portal. The system parses the search query using natural language processing to identify an object of the search query. The system identifies a realm applicable to the object of the search query by matching the object of the search query with one or more high frequency words in the realm applicable to the object of the search query. The system submits the search query to a plurality of search engines to generate a plurality of search results. Each of the plurality of search results includes a root domain. The system identifies a realm applicable to the root domain of each of the plurality of search results by matching one or more high frequency words in the root domain with one or more high frequency words in the realm applicable to the root domain. The system sorts the plurality of search results into an ordered list based on whether the realm applicable to the root domain of each of the plurality of search results matches the realm applicable to the object of the search query. The system then outputs the ordered list.

A system for searching the internet includes a processor and computer-readable memory. The computer-readable memory is encoded with instructions that, when executed by the one or more processors, cause the system to perform the following steps. The system reads metadata tags from a first set of root domains to create a first set of root domain data. The first set of root domain data is clustered into a plurality of realms using a clustering algorithm in which each of the plurality of realms has a threshold. The system receives a search query at a search portal. The system parses the search query using natural language processing to identify an object of the search query. The system identifies a realm applicable to the object of the search query by matching the object of the search query with one or more high frequency words in the realm applicable to the object of the search query. The system submits the search query to a plurality of search engines to generate a plurality of search results. Each of the plurality of search results includes a root domain. The system identifies a realm applicable to the root domain of each of the plurality of search results by matching one or more high frequency words in the root domain with one or more high frequency words in the realm applicable to the root domain. The system sorts the plurality of search results into an ordered list based on whether the realm applicable to the root domain of each of the plurality of search results matches the realm applicable to the object of the search query. The system then outputs the ordered list.

DETAILED DESCRIPTION

According to techniques of this disclosure, a search system can be utilized to provide clustered metasearch results that are relevant to a search input query. The search system can do so by analyzing a search input using Natural Language Processing, querying a plurality of different existing search engines, grouping search results using a categorization model, and ranking search results based on secondary factors including but not limited to recency and search engine rank. The techniques of this disclosure can enhance the relevance of the search results to the search query by using the categorization model to ensure that the search query and the search results are within the same category. The techniques of this disclosure can also decrease the number of irrelevant results by using the aforementioned secondary factors to filter out results that are outdated or not relevant to the search query.

Figure 1:
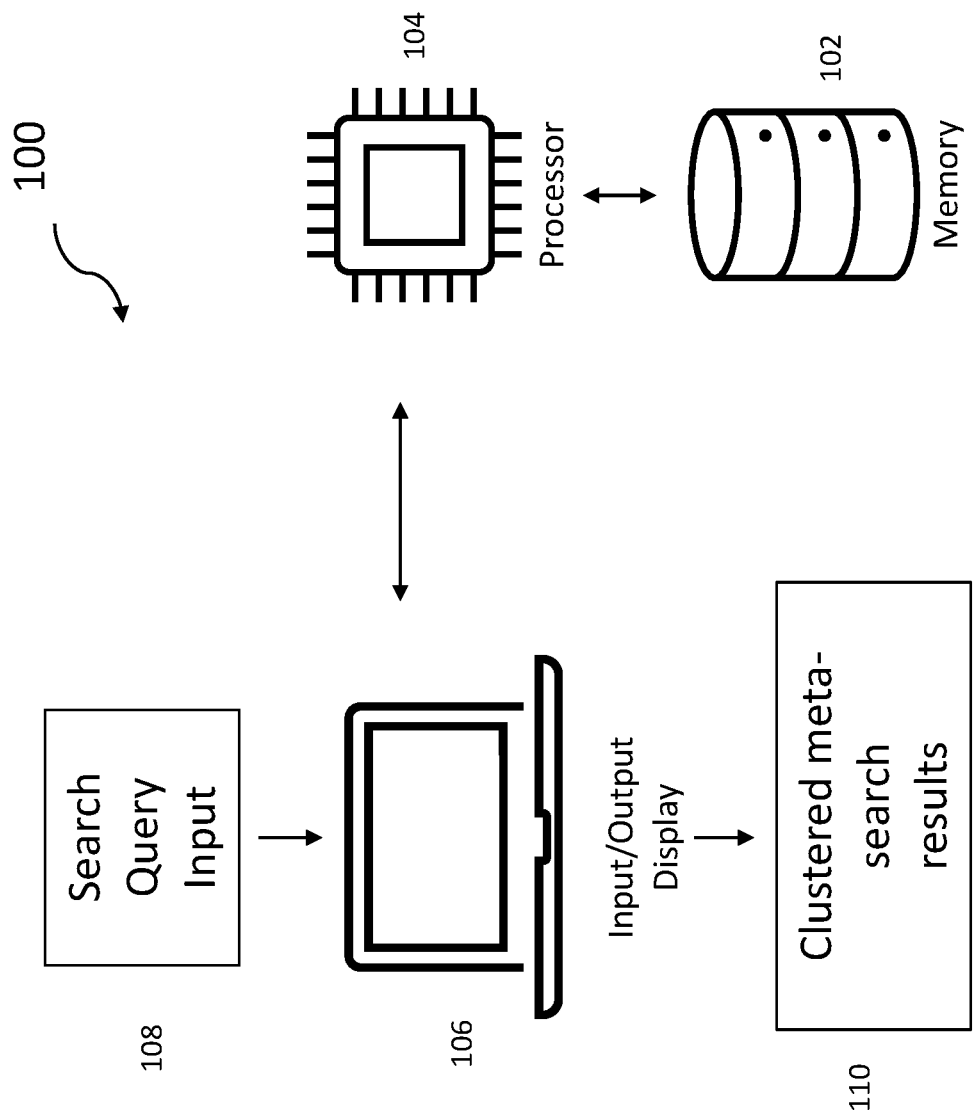
FIG. 1 is a diagram of a system for searching via a clustered metasearch web search tool.

FIG. 1 is a diagram of search system 100 for searching the internet to return results relevant to a search query. In FIG. 1, search system 100 includes computer-readable memory 102, one or more processors 104, and input/output device 106. As illustrated in FIG. 1, search system 100 also involves search query input 108, and clustered metasearch results 110.

Processor 104, in some examples, is configured to implement functionality and/or process instructions for execution within search system 100. For instance, processor 104 can be capable of processing instructions stored in computer-readable memory 102. Examples of processor 104 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 102 can be configured to store information during operation of search system 100. Computer-readable memory 102, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, computer-readable memory 102 is a temporary memory, meaning that a primary purpose of computer-readable memory 102 is not long-term storage. Computer-readable memory 102, in some examples, is described as volatile memory, meaning that computer-readable memory 102 does not maintain stored contents when electrical power to computer-readable memory 102 is removed. Examples of volatile memories can include random access memories (RAM), dynamic random access memories (DRAM), static random access memories (SRAM), and other forms of volatile memories. In some examples, computer-readable memory 102 is used to store program instructions for execution by processor 104. Computer-readable memory 102, in one example, is used by software or applications (e.g., a clustered metasearch application) to temporarily store information during program execution.

Computer-readable memory 102, in some examples, also includes one or more computer-readable storage media. Computer-readable memory 102 can be configured to store larger amounts of information than volatile memory. Computer-readable memory 102 can further be configured for long-term storage of information. In some examples, computer-readable memory 102 includes non-volatile storage elements. Examples of such non-volatile storage elements can include, but are not limited to, magnetic hard discs, optical discs, flash memories, or forms of electrically programmable memories (EPROM) or electrically erasable and programmable (EEPROM) memories.

Input/Output (I/O) device 106 is configured to receive inputs for search system 100 and to provide outputs generated by search system 100 for use by a user and/or other consuming system of such outputs. For example, I/O device 106 can include input elements in the form of a mouse, a keyboard, a microphone, a camera device, a presence-sensitive and/or touch-sensitive display, or other type of device configured to receive input from a user. In certain examples, I/O device 106 can include communication devices usable to communicate with external devices via one or more wired or wireless networks, or both. For instance, communication devices can take the form of a network interface card (e.g., an Ethernet card), an optical transceiver, a radio frequency transceiver, or other type of device that can send and receive information, such as Bluetooth, 3G I/O device 106 can also include output elements, such as a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines.

In operation, a search query input is provided to search system 100, such as by user input provided to I/O device 106. I/O device 106 can, in some examples, include a display as illustrated in FIG. 1. In other examples, I/O device 106 can be operatively connected (e.g. electrically and/or communicatively connected) to a display device. For instance, a user can enter search query input 108 into a text box or other graphical user interface (GUI) element provided by I/O device 106 to initiate the search process. Computer-readable memory 102 is encoded with instructions that, when executed by processor 104, cause system 100 to implement clustered metasearch operations to return relevant results. For instance, as is further described below, system 100 can implement the clustered metasearch operations to return an ordered list of results by executing the following steps via processor 104. System 100 can receive a search query input and parse the search query input using Natural Language Processing (NLP) to identify an object of a search query (e.g. a noun in a search string) and descriptors of the search query (e.g. adjectives and/or other descriptors of the object). System 100 can categorize the search query into a 'realm' based on the object of the search query. The creation and classification of realms will be described in detail in FIG. 2. System 100 can conduct a search across one or more existing search engines using the search query and categorize results into realms. System 100 can sort the results based on the realm(s) applicable to the search results and other additional factors such as the rank of the result within the one or more search engines, or the recency of the result to produce an ordered list.

Accordingly, system 100 can provide clustered metasearch results that are relevant to a search query input. Such clustered metasearch results can enhance the relevance of the search results, thereby enhancing usability of system 100 for searching, e.g., the Internet.

Figure 2:
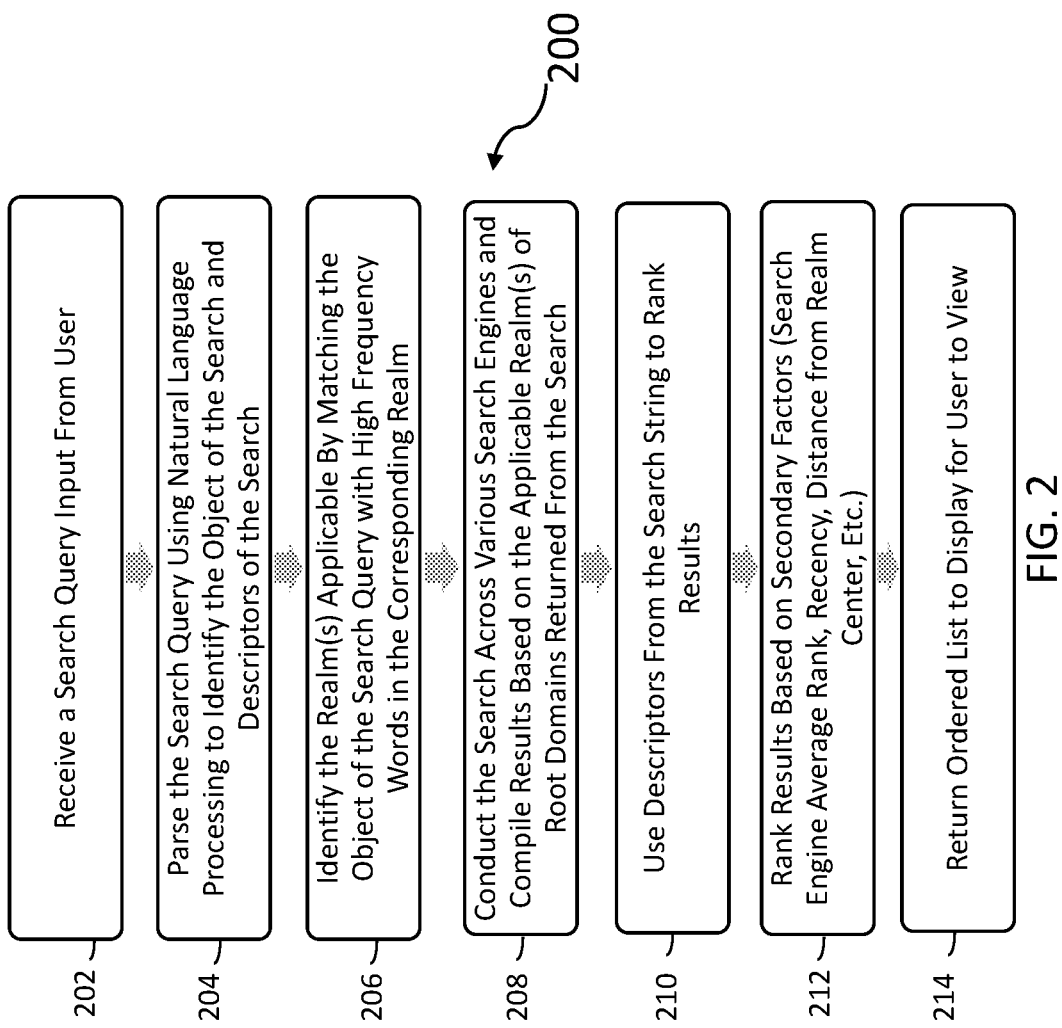
FIG. 2 is a method flowchart detailing one embodiment of steps taken by the system to accept a search query and return results.

FIG. 2 depicts clustered metasearch method 200 detailing one embodiment of the steps taken by search system 100 to accept a search query and return results. For purposes of clarity and ease of discussion, the operations of clustered metasearch method 200 are described below within the context of system 100 of FIG. 1.

Clustered metasearch method 200 begins at step 202 in which the system can receive a search query input from a user, though in other examples, the search query can be received via automated operations, such as a file upload containing one or multiple search queries, or other automated techniques. In some embodiments, search query input 108 is a text string entered by the user in a web portal text box, such as a web portal presented at I/O device 106 (e.g., via the display). In other examples, search query input 108 can be entered via voice command, such as via a microphone integrated with or otherwise operatively connected to I/O device 106. In yet other examples, search query 108 can be automatically loaded to a web portal, software application, or other graphical user interface (GUI) presented by I/O device 106 via a file upload or other automated technique. In general, the search query (or queries) can be received via any technique (user initiated or otherwise) that provides the query to be searched to search system 100.

At step 204, search system 100 parses the search query using Natural Language Processing (NLP) to identify the object of the search query. NLP, here, refers to the ability of a computing device to use rule-based modeling of human language with statistical, machine learning and deep learning models. NLP can have capabilities including part of speech tagging, in which the part of speech of a particular word or piece of text is identified based on the use and context. Thus, NLP can be used to identify nouns, adjectives, and other parts of speech within a search query. NLP can also be used to remove ambiguity from a word which can have multiple meanings. These are non-limiting examples of the capabilities of NLP, which can be used within the techniques of this disclosure.

The example embodiment of FIG. 2 can use part of speech tagging within NLP at step 204. In some embodiments, the object of the search of step 204 is a noun within the search string. In such an embodiment, NLP part of speech tagging identifies the noun as the object of the search. In such an embodiment, the adjectives, or other descriptors or modifiers, would be classified as the descriptors of the search by NLP. Then, search system 100 uses the identified noun to determine the realm in which the search query lies. NLP can also be used in step 204 to remove ambiguity from the search query. For example, a search query might have an object with a plurality of meanings. NLP can use the descriptors, for example the adjectives or other modifiers, to resolve the ambiguity and arrive at a definition of the object of the search.

At step 206, search system 100 identifies a realm or realms applicable to the object of the search query by matching the object of the search query with high frequency words in the realm applicable to the object of the search query.

A realm is a category mapped in hyperspace, wherein the realm has a center and an outer threshold. The realm contains a plurality of words, wherein words that are more relevant to the realm category are mapped closer to the center of the realm whereas words that are still within the realm category, but less relevant to the category, are mapped farther away from the realm center, but within the outer threshold. In an illustrative and non-limiting example, a particular realm can be related to furniture. In such a realm, words that can be more relevant within the realm can include 'desk', 'table', and/or 'chair'. Words that can still be within the realm but can be less relevant can include 'wood' and/or 'paint'. Thus, the more relevant words are mapped closer to the furniture realm center, while the less relevant words are mapped farther away from the realm center.

A certain number of realms, N (i.e., an arbitrary number greater than one), can be created manually at an initial development phase of search system 100. The initial manual creation of realms includes defining the realm, and defining which words are present within the realm threshold. The initial manual creation further includes defining a realm center, wherein words that are more relevant to the realm are grouped closer to the realm center, whereas words that are less relevant to the realm, but still contained within the realm, are further away from the realm center but still within the realm threshold. The realms can then be further subdivided using unsupervised machine learning. In such a case, search system 100 can use a centroid-based clustering algorithm to define additional realms. A clustering algorithm generally involves providing input data to a computer algorithm and allowing the algorithm to determine a cluster based on similarities between data points. Centroid-based clustering further involves separating data based on centroids within the data set. Each data point exists within one or more clusters in hyperspace and is a certain distance from the centroid of the one or more clusters. Search system 100 can therefore implement unsupervised machine learning using a centroid-based clustering algorithm. In such an example, search system 100 can provide the created realms along with the text present in the realm and the location of the words within the realm as they are mapped in hyperspace. The unsupervised machine learning process can then further subdivide realms based on the centroid-based clustering algorithm and the input given to the algorithm. The unsupervised machine learning process can continue to subdivide realms based on the results of clustered metasearch method 200, as described in step 212.

Search system 100 can initially have a set of N realms. System 100 can then examine a set of root domains across the internet to determine into which of the N realms the root domain should be categorized. A root domain is the highest hierarchical level of a website that contains all the data encompassed in the subdomains of the website. As an example, a root domain of a website can contain one, two, three, or any number of different webpages branching from the main website. The root domain of such a website includes all the information within the one, two, three, or any number of different webpages. Thus, system 100 examines the text within a root domain and determines which realm that root domain should reside based on which high-frequency words are present within the root domain and which realms contain such high-frequency words.

In examining the high-frequency words present within the root domain, search system 100 can examine metadata tags or use webcrawling. Metadata tags of root domains are keywords or terms assigned to the root domain, typically by the root domain creator. Webcrawling can involve archiving the entirety of the text within a given root domain. Thus, webcrawling includes archiving the text of all subdomains of a root domain, including any number of webpages that branch off from the main website. Thus, search system 100 can refer to metadata tags of a search domain to determine which words within the root domain are high-frequency words, and which of those words is also present in an existing realm. Search system 100 can then sort the root domain into the appropriate realm. Search system 100 can also use webcrawling to examine the entirety of the text on a root domain and again determine which of those words are high-frequency words to sort the root domain into an existing realm.

A root domain is more likely to be sorted into a realm if the high-frequency words occurring within the root domain are words that are contained within a realm and close to that realm's center. A root domain can still also be sorted into a realm if the high-frequency words occurring within the root domain are words that are contained within a realm, but the words are closer to the realm threshold instead of the realm center. A root domain can be sorted into multiple realms if the high-frequency words within the root domain are present across multiple different realms.

The examination of metadata tags and/or webcrawling of a root domain can also be used to further group and subdivide realms via the aforementioned unsupervised machine learning. In one example, a root domain can be categorized in a particular realm. The words examined by search system 100 within the root domain's metadata tags and/or by webcrawling the root domain can inform the clustering algorithm as to which words should appear within the realm and the relative distance of such words to the realm center. Thus, the clustering algorithm can recognize that a high-frequency word occurring within a root domain that is grouped in a particular realm should be moved closer to the realm center. Conversely, a word that is close to the realm center, but is not frequently occurring within a root domain that is grouped in a particular realm can be moved further away from the realm center by the clustering algorithm. A similar approach can be used by the clustering algorithm to add words to a realm that were not previously included, or to remove existing words from a realm.

At step 208, search system 100 submits the search query across various search engines and compiles search results. For example, a search query input from step 202 can be submitted by search system 100 to various (e.g., two, three, or more than three) commercially available and/or proprietary search engines. In an embodiment in which three separate search engines are utilized, the list of results from all three search engines is compiled and sorted into the applicable realm of the root domain of the search result. As described above, each root domain is sorted into a realm based on the high-frequency words that occur within the root domain and whether such high-frequency words match (or are otherwise associated with) words within one or more realms. In some embodiments, the applicable realm can be identified by the system based on previous sorting of root domains into realms. The realms applicable to the root domain are cached at the time of sorting and stored within computer-readable memory 102. In other embodiments, the system can sort the root domain in real time into the applicable realm(s). In such embodiments, the realm is analyzed by search system 100 for high-frequency words within the root domain and is sorted into one or more realms based upon which high-frequency words match words within the one or more realms. This process can be accomplished by examining metadata tags and/or by webcrawling as described above.

Search system 100 can sort the search results into an ordered list based on whether the realm applicable to the root domain of each of the search results is the same as the realm of the object of the search query identified at step 206. In some embodiments, search system 100 can exclude a search result if the realm applicable to the object of the search query in step 202 is different than a realm applicable to the root domains of the search result. In such an embodiment, root domains that do fall under the same realm or realms as the object of the search in step 202 can be included in the search results. In other embodiments, the search system 100 can sort the search results into an ordered list based on the realm applicable to the root domain of each search result wherein a higher priority is given to a search result within a realm that is the same as the realm applicable to the object of the search query in 202. In such an embodiment, a lower priority can be given to a search result within a realm that is different than the realm applicable to the object of the search query in step 202.

At step 210, search system 100 uses descriptors from the search query input (described above with respect to steps 202 and 204) to rank the results returned from step 208. As described above, the identification of descriptors from the search query is done through Natural Language Processing (NLP). NLP part of speech tagging identifies the adjectives, or other modifiers of the object of the search, as the descriptors of the search. In some embodiments, the system can look for similar descriptors to be present in the root domain of the returned result. In such an embodiment, the system can be configured to sort the search results based on the one or more descriptors. A higher priority can be given to the search results that contain the one or more descriptors. Conversely, if the descriptor is not present in the returned result, the result can be given a lower priority. In some embodiments where multiple descriptors are identified in step 204, a root domain with a higher number of similar descriptors can be given higher priority while a root domain with a lower number of similar descriptors can be given a lower priority. The descriptors in a given root domain can be identified prior to the search and cached within computer-readable memory 102 of FIG. 1, or they can be determined in real time by examining the metadata tags of the returned result or by webcrawling the text on the root domain of the returned result.

At step 212, search system 100 uses additional secondary factors to further rank the results. One such secondary factor is the search engine average rank. In some embodiments, the results are ranked based on their position in the results page of the various search engines of step 208. In such an embodiment, the search engine ranking is calculated by averaging a position of a search result within the search engines. The position of the result within the search engines is determined by the numerical ranking of the search result on the results page of a search engine. For example, a search result that was queried on three separate search engines can have been returned as the first result on a first of the search engines, the first result on the second of the search engines, and the fourth result on the third of the search engines. In such an example, the result would have an average search engine rank of 2, because, on average across the three search engines, it would appear as the second result. In some embodiments, one search engine can be given greater weight in averaging the search engine rank over another search engine.

Another such secondary factor that can be used at step 212 is the recency of the results. In some embodiments, the results can be sorted based on the time of the publication. In some embodiments, a higher priority can be given to a more recent result. In other embodiments, the search results can be sorted based on the average recency of results returned within the realm applicable to the object of the search query. In such an embodiment, a higher priority can be given to a result that is closer to an average recency of results returned within the realm applicable to the object of the search query. In such an embodiment, results that are further away from the average recency of results within the realm applicable to the object of the search query would be given a lower priority.

Another such secondary factor that can be used at step 212 is the distance from the center of the applicable realm. In some embodiments, the results in step 212 can be sorted based on their proximity to a mathematical center of the realm applicable to the object of the search query. In some embodiments, the realm is mapped in hyperspace, and the realm comprises a mathematical center. The system can calculate the mathematical center of the realm by analyzing high-frequency words present in the root domains contained within the realm. In such an embodiment, a search result is closer to the mathematical center of the realm applicable to the object of the search query when the search result contains a higher number of high frequency words which are also present in the realm applicable to the object of the search query. A search result is farther from the mathematical center of the realm applicable to the object of the search query when the search result contains a lower number of high frequency words which are also present in the realm applicable to the object of the search query. Thus, results that contain many high frequency words that are similar to the high frequency words in the mathematical center of the realm may be given higher priority, and results that contain fewer high-frequency words in the mathematical center of the realm may be given lower priority.

The above description of secondary factors is intended to be non-exclusive and non-exhaustive. Various other secondary factors compatible with the techniques of this disclosure can be used to further sort and rank returned search results.

At step 214, search system 100 displays an ordered list of results to the user via input/output display 106. The ordered list includes the results as sorted in the previous steps of clustered metasearch method 200. For instance, at step 208, results are ordered based on whether the root domain of the results are sorted into the same realm as the object of the search query, wherein the realm applicable to the object of the search query was identified in step 206. The results are further ordered in step 210 based on the descriptors present in the root domains of the search results and the descriptors present within the search query. The results are further ordered in step 212 by the secondary factors as described above. The relative weight of each of the factors contributing to the ordered list can vary.

These results can be viewable on a display device and contain interactive links, such as hyperlinks or other user interface elements that enable user interaction for enabling the user to further explore search results using the applicable user interface element. User interaction of search results can be used in the unsupervised machine learning described at step 206. High-frequency words that appear within a search result with a high number of user interactions can be moved closer to the center of the applicable realm in which the root domain of the search result was classified. Such words can also be added to the applicable realm if they were not previously included within the realm threshold. Conversely, high-frequency words that appear within a search result with a low number of user interactions can be moved further away from the center of the applicable realm in which the root domain of the search result was classified. Such words can also be removed from the realm entirely. Thus, search system 100 can adjust realm centers and thresholds based on user interactions with search results.

In addition, root domains can be recategorized into different realms based on user interactions with the search results. In an example embodiment, the object of a search input can be categorized in a realm as described at step 206. A search result from a root domain within that realm is displayed in the list of search results. If the search result receives a minimal level of interaction, the root domain can be removed from the realm or recategorized into a different realm. The level of interaction required to remove a result from a realm is determined by a clustering algorithm within search system 100. Further, if a search result from a root domain that appears in a different realm than that of the object of the search input receives a high level of interaction, the root domain can be added to the realm applicable to the object of the search input. As described above, a root domain can be included in a plurality of realms. The level of interaction required to add a root domain to a realm is determined by a clustering algorithm within search system 100.

Figure 3:
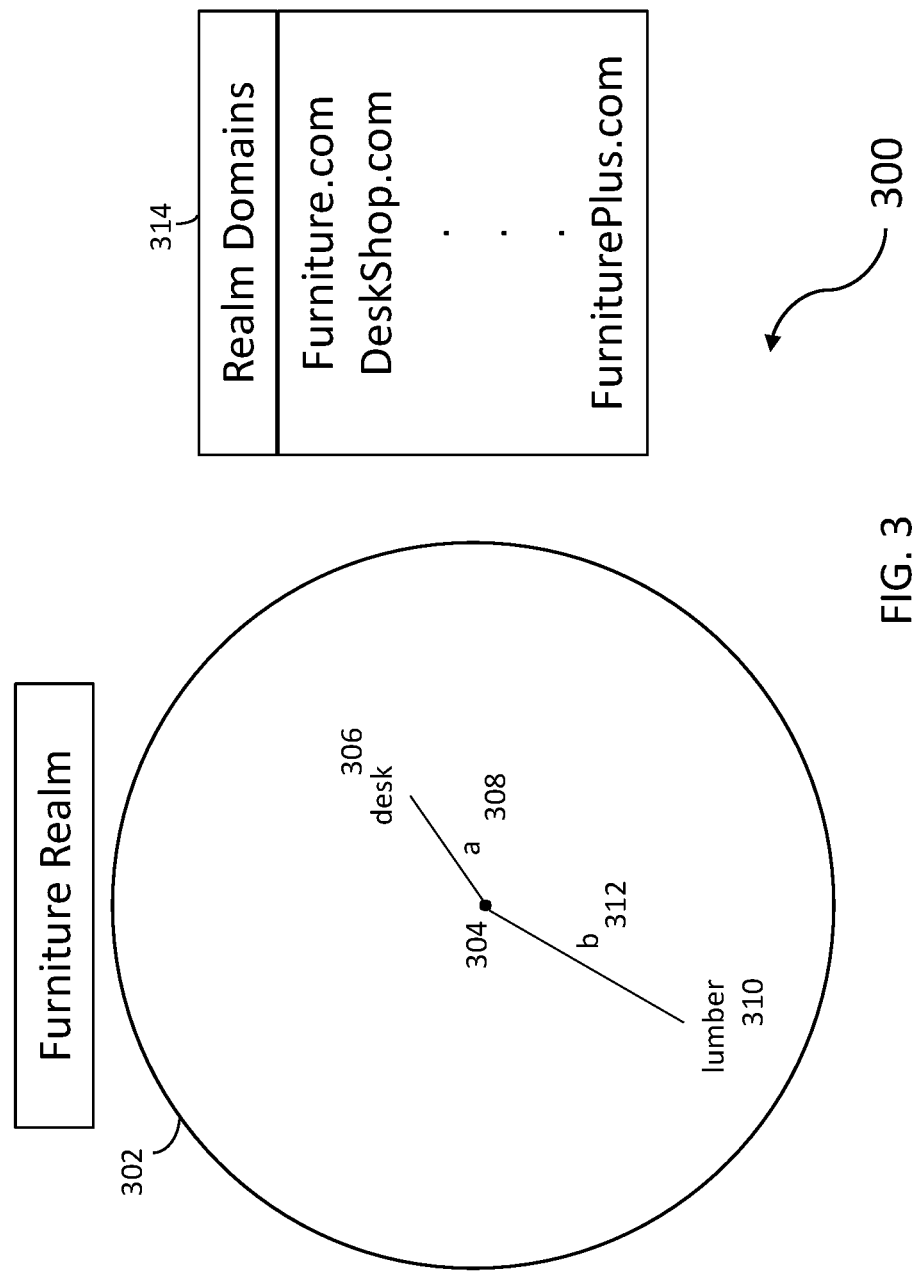
FIG. 3 is a visual depiction of one embodiment of a categorization model used by the system.

FIG. 3 is a visual depiction of one embodiment of categorization model 300 used by search system 100. FIG. 3 presents an example of a realm by depicting furniture realm 302. Furniture realm includes realm center 304, first term 306, distance "a" 308, second term 310, distance "b" 312, and realm domain cache 314. For purposes of clarity and ease of discussion, the examples of FIG. 3 are described herein with reference to search system 100 of FIG. 1 and the techniques described above with respect to FIG. 2.

In an example embodiment, a user can enter a search query related to purchasing furniture. Search system 100, as described in FIG. 2, examines the search query using NLP and categorizes the object of the search in furniture realm 302. Search system 100 can then conduct a search across various search engines as described in step 208 of FIG. 2 and return various root domains as results. As defined above, a root domain is the highest hierarchical level of a website which contains all the data encompassed in the subdomains of the website. In some embodiments, root domains relevant to the furniture realm, or any other applicable realm, are cached prior to the search in realm domain cache 314. Search system 100 can then determine if the search results from the various search engines fall within the realm domains cache. Search system 100 does so by examining computer-readable memory 102, where the cache of realms and the root domains applicable to those realms are stored. If the root domain is within the applicable realm, the root domain is contained within realm domain cache 314. If the root domain is not within the applicable realm, the root domain is not stored in realm domain cache 314. In some embodiments, if the root domain does not fall within realm domain cache 314, the result is excluded from the final list displayed to the user. In other embodiments, if the root domain does not fall within realm domain cache 314, the result is given lower priority in the final list of results, but is ultimately included (or displayed) in such final list of results.

In the same example embodiment, furniture realm 302 comprises various terms which exist at various distances from realm center 304. In FIG. 3, first term 306 is labeled 'desk' and second term 310 is labeled 'lumber'. First term 306 is a distance 'a' away from realm center 304 and second term 310 is a distance 'b' away from realm center 304. The distances are mapped in hyperspace as described in the creation of realms in FIG. 1. In some embodiments, first term 306 and second term 310 are mapped as multi-dimensional vectors, wherein the distances from realm center 304 are determined by a vector value. Other numerical methods can be used to determine distance in hyperspace.

In this embodiment, distance 'a' is less than distance 'b' and hence first term 306 is closer to realm center 304 than second term 310. In some embodiments, words that are closer to realm center 304 are words that are more relevant to the realm category. In some embodiments, words that are closer to realm center 304 are words that occur with a high frequency within root domains saved in realm domain cache 314. In the illustrated example of FIG. 3, the term 'desk' is a word that is more relevant to the furniture realm than the word 'lumber'. In some embodiments, the term 'desk' occurs more frequently in root domains saved in realm domain cache 314 than the term 'lumber'. Thus, the distance from 'desk' to realm center 304 is less than the distance from 'lumber' to realm center 304. In such an embodiment, root domain results which contain words that are closer to realm center 304 (e.g. 'desk') may be given higher priority in the final list of results, while root domain results which contain words farther away from realm center 304 (e.g. 'lumber') may be given lower priority in the final list of results.

Figure 4:
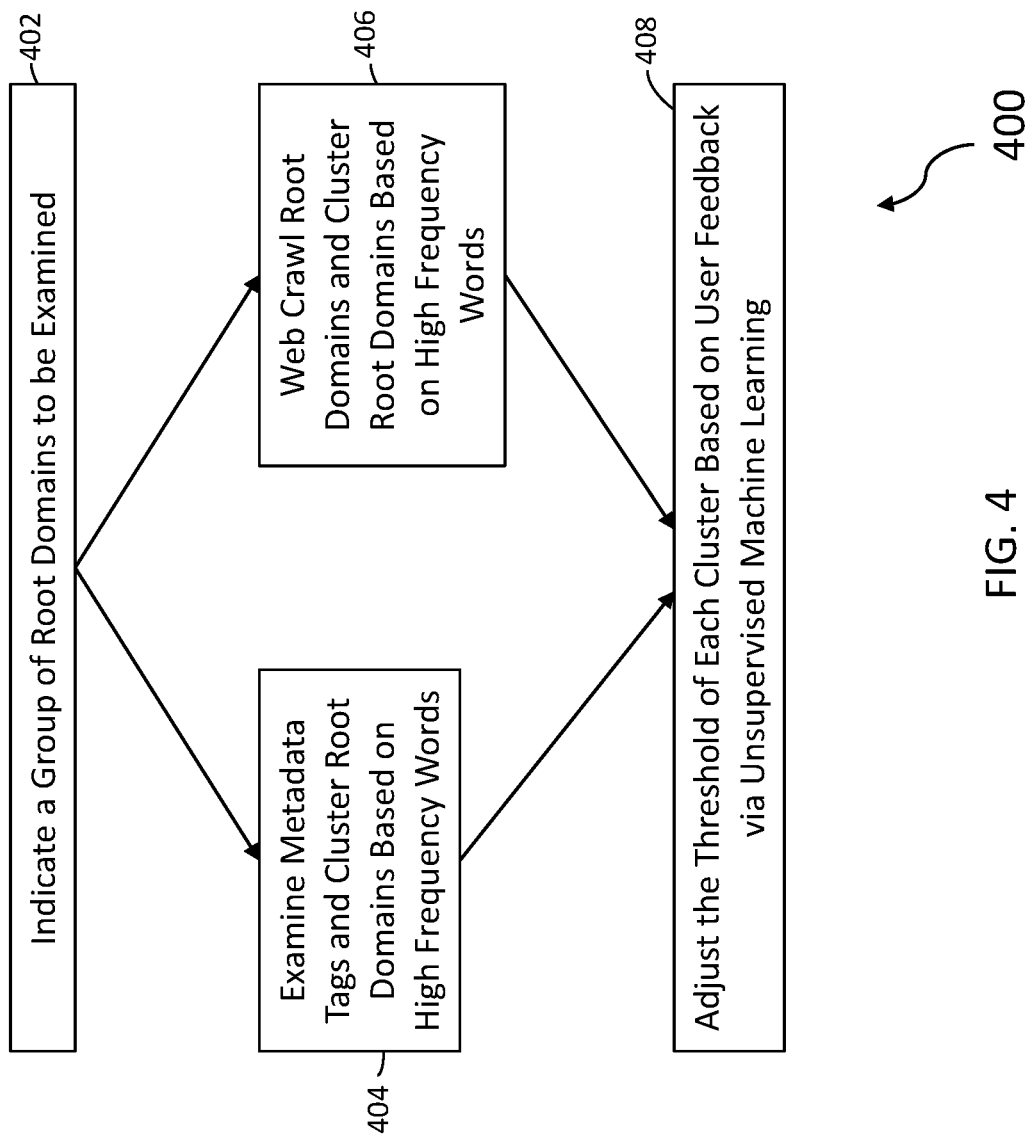
FIG. 4 is a method flowchart detailing an example process of forming realms via clustering and machine learning.

FIG. 4 depicts cluster forming method 400 detailing one embodiment of the steps taken by search system 100 to form realms via clustering and machine learning. At step 402 of method 400, a group of root domains to be examined is selected. After step 402, either step 404 or step 406 can be followed.

In step 404, search system 100 can read metadata tags from the set of root domains in step 402, producing root domain data. Search system 100 can then cluster the root domain data into various realms using a clustering algorithm. The clustering algorithm can be a centroid-based clustering algorithm. The search system 100 can examine the words occurring within the metadata tags and identify which words occur at a high frequency within the root domain. The clustering algorithm can then sort the root domain into an existing realm based on whether the high-frequency words of the root domain occur within the existing realm. The creation of realms is outlined above in the description of FIG. 1.

In step 406, search system 100 webcrawls the group of root domains selected in step 402. Webcrawling can involve archiving the entirety of the text within a given root domain, as described above in FIG. 1. The search system 100 can examine the words occurring within the archived text of the root domain, and identify which words occur at a high frequency within the root domain. The clustering algorithm can then sort the root domain into an existing realm based on whether the high-frequency words of the root domain occur within the existing realm. The creation of realms is outlined above in the description of FIG. 1.

In some embodiments, only step 404 is used to cluster root domains from metadata tags and to form realms, and step 406 is not used. In other embodiments, only step 406 is used to cluster root domains from webcrawling and to form realms, and step 404 is not used. In still other embodiments, a combination of steps 404 and 406 is used, wherein some root domains are clustered based on metadata tags and others are clustered using webcrawling.

Finally, in step 408, search system 100 adjusts the threshold of each cluster using unsupervised machine learning based on user feedback on the list of results. Step 408 can occur after the clustered metasearch method 200 of FIG. 2. Search system 100 can adjust the threshold of the realm to account for this recognition. Example embodiments of unsupervised machine learning are explained above in FIG. 1. In some embodiments, if a root domain receives a high level of interaction, the high-frequency words occurring within the root domain can be moved closer to the realm center for the realm applicable to the object of the search query.

In another embodiment, a result can be highly rated within a realm based on factors such as recency and proximity to the realm center. If, however, the result is not one which users have interacted with, search system 100 can recognize, through unsupervised machine learning, that the result should be outside of the realm or farther away from the realm center. In some cases, the result search system 100 can adjust the realm threshold to exclude such a result.

Figure 5:
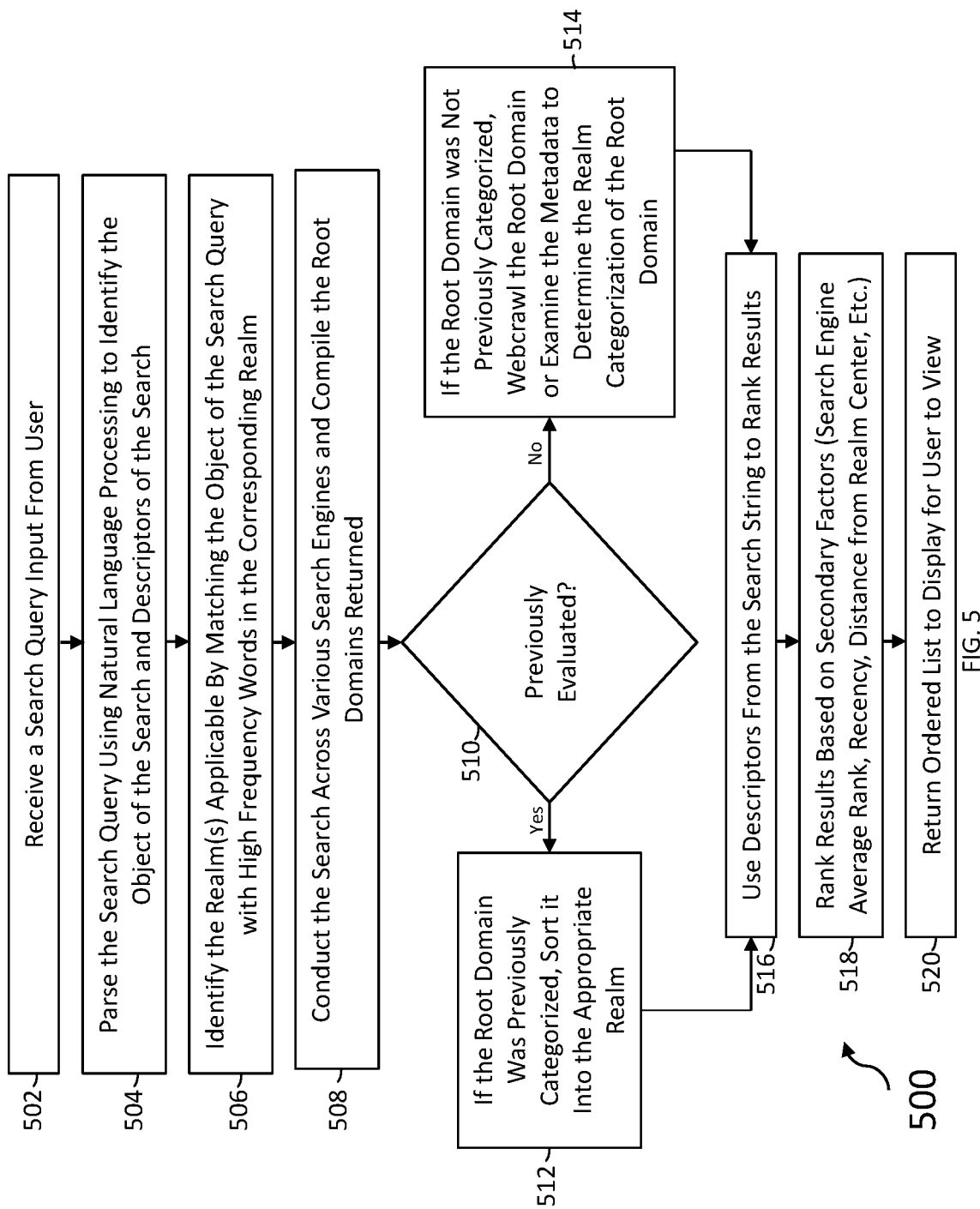
FIG. 5 is a method flowchart detailing an example process of clustering results during a real-time search of previously unclustered root domains.

FIG. 5 depicts clustered metasearch method 500 detailing one embodiment of the steps taken by search system 100 to cluster results during a real-time search of previously unclustered root domains. Clustered metasearch method 500 begins at step 502 in which search system 100 can receive a search query input from a user. At step 504, search system 100 parses the search query input using Natural Language Processing (NLP) to identify the object of the search and the descriptors of the search. At step 506, search system 100 identifies the realm or realms applicable by matching the object of the search query with high frequency words in the corresponding realm. At step 508, search system 100 conducts the search across various search engines and compiles the root domains returned. At decision 510, search system 100 determines if the root domain was previously evaluated. If the returned root domains were previously categorized into realms, as described in FIG. 4, then step 512 applies. If the root domains were not previously categorized, then step 514 applies, and the root domains are sorted into the appropriate realm. At step 514, search system 100 can sort a previously unsorted root domain into a realm by reading the metadata tags and sorting the root domain accordingly. At step 514, search system 100 can also sort a previously unsorted root domain into a realm by webcrawling the previously unsorted root domain and sorting the root domain accordingly. In still other embodiments, both metadata tags and webcrawling can be used to sort the previously unsorted root domain accordingly. At either step 512 or step 514, after the root domain is sorted into the appropriate realm, it can be excluded from the results if it does not match the realm of the object of the search query from step 504. In other embodiments, the root domain can still be included in the results if it does not match the realm of the object of the search query from step 504, but it can be given a lower priority.

At step 516 the descriptors identified in step 504 via NLP can be used to rank results. At step 518, search system 100 uses additional secondary factors to further rank the results. A non-exclusive list of these secondary factors is disclosed at step 212 of FIG. 2. At step 520, search system 100 returns the ordered list to input/output display 106 for the user to view.

The system disclosed provides several advantages. Search system 100 improves the relevance of clustered metasearch results 110 results by narrowing the results based on the applicable realm. By doing so, search system 100 can filter out irrelevant results that do not pertain to the same realm as search query input 108. Further, search system 100 allows for further filtering using factors such as recency, search engine rank, and distance from the realm center. This additional filtering can increase the relevance of clustered metasearch results 110 which are returned to the user. Search system 100 also has the advantage of improving clustered metasearch results 110 over time as search system 100 uses unsupervised machine learning as disclosed in step 408 of cluster forming method 400 in FIG. 4.

Discussion of Possible Embodiments

The following are non-exclusive descriptions of possible embodiments of the present invention.

A system for searching the internet, including a processor and computer-readable memory. The computer-readable memory is encoded with instructions that, when executed by the one or more processors, cause the system to perform the following steps. The system receives a search query at a search portal. The system parses the search query using natural language processing to identify an object of the search query. The system identifies a realm applicable to the object of the search query by matching the object of the search query with one or more high frequency words in the realm applicable to the object of the search query. The system submits the search query to a plurality of search engines to generate a plurality of search results. Each of the plurality of search results includes a root domain. The system identifies a realm applicable to the root domain of each of the plurality of search results by matching one or more high frequency words in the root domain with one or more high frequency words in the realm applicable to the root domain. The system sorts the plurality of search results into an ordered list based on whether the realm applicable to the root domain of each of the plurality of search results matches the realm applicable to the object of the search query. The system then outputs the ordered list.

The system of the preceding paragraph can optionally include, additionally and/or alternatively, any one or more of the following features, configurations and/or additional components.

In a further embodiment, the computer-readable memory is encoded with instructions that, when executed by the processor, cause the system to parse the search query using natural language processing to identify one or more descriptors from the search query.

In a further embodiment, the computer-readable memory is encoded with instructions that, when executed by the processor, cause the system to sort the ordered list results based on the one or more descriptors. In such an embodiment, priority is given to the search results that contain the one or more descriptors.

In a further embodiment, the computer-readable memory is encoded with instructions that, when executed by the processor, cause the system to exclude a search result if the realm applicable to the object of the search query is different than a realm applicable to the root domain of the search result.

In a further embodiment, the computer-readable memory is encoded with instructions that, when executed by the processor, cause the system to sort the plurality of search results based on the realm applicable to the root domain of each of the plurality of search results. In such an embodiment, priority is given to a search result within a realm that is the same as the realm applicable to the object of the search query.

In a further embodiment, the computer-readable memory is encoded with instructions that, when executed by the processor, cause the system to sort the ordered list based on a search engine ranking. In such an embodiment, the search engine ranking is calculated by averaging a position of a search result within the plurality of search engines. Further, the position of the search result within the plurality of search engines is determined by a numerical ranking of the search result on a results page of a search engine.

In a further embodiment, the computer-readable memory is encoded with instructions that, when executed by the processor, cause the system to sort the ordered lists based on the time of publication. In such an embodiment, priority is given to a more recent result.

In a further embodiment, the computer-readable memory is encoded with instructions that, when executed by the processor, cause the system to sort the ordered list based on the time of publication. In such an embodiment, priority is given to a result that is closer to an average recency of results returned within the realm applicable to the object of the search query.

In a further embodiment, the computer-readable memory is encoded with instructions that, when executed by the processor, cause the system to sort the plurality of search results based on a proximity of a search result to a mathematical center of the realm applicable to the object of the search query.

In a further embodiment, the distance of the search result from the mathematical center of the realm applicable to the object of the search query is determined by a number of high-frequency words which are common to the search result and the realm applicable to the object of the search query.

A system for searching the internet, including a processor and computer-readable memory. The computer-readable memory is encoded with instructions that, when executed by the one or more processors, cause the system to perform the following steps. The system reads metadata tags from a first set of root domains to create a first set of root domain data. The first set of root domain data is clustered into a plurality of realms using a clustering algorithm in which each of the plurality of realms has a threshold. The system receives a search query at a search portal. The system parses the search query using natural language processing to identify an object of the search query. The system identifies a realm applicable to the object of the search query by matching the object of the search query with one or more high frequency words in the realm applicable to the object of the search query. The system submits the search query to a plurality of search engines to generate a plurality of search results. Each of the plurality of search results includes a root domain. The system identifies a realm applicable to the root domain of each of the plurality of search results by matching one or more high frequency words in the root domain with one or more high frequency words in the realm applicable to the root domain. The system sorts the plurality of search results into an ordered list based on whether the realm applicable to the root domain of each of the plurality of search results matches the realm applicable to the object of the search query. The system then outputs the ordered list.

The system of the preceding paragraph can optionally include, additionally and/or alternatively, any one or more of the following features, configurations and/or additional components.

In a further embodiment of the foregoing system, the clustering algorithm is a centroid based clustering algorithm.

In a further embodiment, the computer-readable memory is encoded with instructions that, when executed by the processor, cause the system to adjust the threshold using unsupervised machine learning based on user feedback on the list of results.

In a further embodiment, the computer-readable memory is encoded with instructions that, when executed by the processor, cause the system to sort a previously unsorted root domain into a realm by reading the metadata tags.

In a further embodiment, the computer-readable memory is encoded with instructions that, when executed by the processor, cause the system to sort a previously unsorted root domain into a realm by webcrawling the previously unsorted root domain.

In a further embodiment, the computer-readable memory is encoded with instructions that, when executed by the processor, cause the system to calculate a mathematical center of a realm by analyzing high frequency words present in a subset of root domains contained within the realm.

In a further embodiment, the computer-readable memory is encoded with instructions that, when executed by the processor, parse the search query using natural language processing to identify one or more descriptors from the search query.

In a further embodiment, the computer-readable memory is encoded with instructions that, when executed by the processor, cause the system to sort the ordered list based on the one or more descriptors. In such an embodiment, priority is given to the search results that contain the one or more descriptors.

In a further embodiment, the computer-readable memory is encoded with instructions that, when executed by the processor, cause the system to sort the ordered list based on the realm applicable to the root domain of each of the plurality of search results. In such an embodiment, priority is given to a search result within a realm that is the same as the realm applicable to the object of the search query.

In a further embodiment, the computer-readable memory is encoded with instructions that, when executed by the processor, cause the system to exclude a search result if the realm applicable to the object of the search query is different than a realm applicable to the root domain of the search result.

The invention claimed is:

1. A system for searching the internet, the system comprising:
    a processor; and
    computer-readable memory encoded with instructions that, when executed by the one or more processors, cause the system to:
        receive, at a search portal, a search string;
        identify a realm applicable to the search string by matching the search string with one or more high frequency words in the realm applicable to the search string;
        submit the search string to a plurality of search engines to generate a plurality of search results;
        identify a realm applicable to each of the plurality of search results by matching one or more high frequency words contained within each of the plurality of search results with one or more high frequency words in the realm applicable to each of the plurality of search results;

sort the plurality of search results into an ordered list based on whether the realm applicable to the plurality of search results matches the realm applicable to the search string; and display the ordered list.

2. The system of claim 1, wherein the computer-readable memory is further encoded with instructions that, when executed by the processor, cause the system to:

parse the search string using natural language processing to identify an object of the search string.

3. The system of claim 2, wherein the realm applicable to the search string is determined based upon matching the object of the search string with one or more high frequency words in the realm applicable to the search string.

4. The system of claim 2, wherein the object of the search string is determined by part of speech tagging within the natural language processing.

5. The system of claim 2, wherein the computer-readable memory is further encoded with instructions that, when executed by the processor, cause the system to:

parse the search string using natural language processing to identify one or more descriptors from the search string.

6. The system of claim 5, wherein the computer-readable memory is further encoded with instructions that, when executed by the processor, cause the system to:

sort the ordered list based on the one or more descriptors, wherein priority is given to search results that contain the one or more descriptors.

7. The system of claim 1, wherein the computer-readable memory is further encoded with instructions that, when executed by the processor, cause the system to:

parse the search string using natural language processing to remove ambiguity from words within the search string having multiple definitions.

8. The system of claim 1, wherein each of the plurality of search results comprises a root domain.

9. The system of claim 8, wherein the root domain is the highest hierarchical level of a website including all the data encompassed in one or more subdomains of the website.

10. The system of claim 9, wherein the one or more high frequency words contained within each of the plurality of search results are contained within metadata tags of the root domain.

11. The system of claim 1, wherein the realm applicable to each of the plurality of search results is cached within the computer readable memory at a time of sorting.

12. The system of claim 1, wherein the computer-readable memory is further encoded with instructions that, when executed by the processor, cause the system to:

sort the ordered list based on a search engine ranking, wherein:

the search engine ranking is calculated by averaging a position of a search result within the plurality of search engines; and the position of the search result within the plurality of search engines is determined by a numerical ranking of the search result on a results page of a search engine.

13. The system of claim 1, wherein the computer-readable memory is further encoded with instructions that, when executed by the processor, cause the system to:

sort the ordered list based on a time of publication, wherein priority is given to a more recent result.

14. The system of claim 1, wherein the computer-readable memory is further encoded with instructions that, when executed by the processor, cause the system to:

sort the ordered list based on the time of publication, wherein higher priority is given to a result that is closer to an average recency of results returned within the realm applicable to the object of the search string.

15. The system of claim 1, wherein the computer-readable memory is further encoded with instructions that, when executed by the processor, cause the system to:

sort the ordered list based on the proximity of the one or more high frequency words contained within each of the plurality of search results to a mathematical center of the realm applicable to the search string.

16. A system for searching the internet, the system comprising:

a processor; and computer-readable memory encoded with instructions that, when executed by the one or more processors, cause the system to:

read website data from a first set of root domains to produce a first set of root domain data;

cluster the first set of root domain data into a plurality of realms;

receive, at a search portal, a search string;

identify a realm applicable to the search string by matching the search string with one or more high frequency words in the realm applicable to the search string;

submit the search string to a plurality of search engines to generate a plurality of search results;

identify a realm applicable to each of the plurality of search results by matching one or more high frequency words contained within each of the plurality of search results with one or more high frequency words in the realm applicable to each of the plurality of search results;

sort the plurality of search results into an ordered list based on whether the realm applicable to the plurality of search results matches the realm applicable to the search string; and display the ordered list.

17. The system of claim 16, wherein the clustering algorithm is a centroid based clustering algorithm.

18. The system of claim 16, wherein each of the plurality of realms comprise a realm center and a realm threshold.

19. The system of claim 18, wherein the computer-readable memory is further encoded with instructions that, when executed by the processor, cause the system to:

adjust the realm threshold using unsupervised machine learning based on user feedback on the ordered list.

20. The system of claim 16, wherein the website data from the first set of root domains comprises metadata tags of each root domain within the first set of root domains.

* * * * *